United States Patent
Wagner et al.

(10) Patent No.: US 11,208,285 B2
(45) Date of Patent: Dec. 28, 2021

(54) BRAKE DEVICE AND METHOD FOR OPERATING A BRAKE DEVICE

(71) Applicant: Felix Waldner GmbH, Linz (AT)

(72) Inventors: Hugo Maximilian Wagner, Perg (AT); Thomas Sandner, St. Oswald bei Freistadt (AT)

(73) Assignee: FELIX WALDNER GMBH, Linz (AT)

( * ) Notice: Subject to any disclaimer, the term of this patent is extended or adjusted under 35 U.S.C. 154(b) by 214 days.

(21) Appl. No.: 16/550,780

(22) Filed: Aug. 26, 2019

(65) Prior Publication Data

US 2020/0071112 A1 Mar. 5, 2020

(30) Foreign Application Priority Data

Aug. 31, 2018 (DE) .......................... 102018214862.7

(51) Int. Cl.
*B65H 18/20* (2006.01)
*B65H 23/195* (2006.01)

(52) U.S. Cl.
CPC ........... *B65H 23/195* (2013.01); *B65H 18/20* (2013.01); *B65H 2301/4148* (2013.01); *B65H 2408/2326* (2013.01)

(58) Field of Classification Search
CPC ...... B65H 23/14; B65H 23/195; B65H 18/20; B65H 2408/2326; B65H 2301/4148; B21C 47/003; B21C 47/006
See application file for complete search history.

(56) References Cited

U.S. PATENT DOCUMENTS

| 3,386,679 | A | * | 6/1968 | Foulon | ................. B21C 47/006 242/419.5 |
| 3,854,672 | A | * | 12/1974 | Tilban | .................... B65H 23/14 226/195 |
| 5,007,272 | A | * | 4/1991 | Matsunaga | ........... B21C 47/003 226/195 |
| 5,322,229 | A | * | 6/1994 | Imada | .................... B21B 39/08 226/195 |

FOREIGN PATENT DOCUMENTS

| AT | NR377930 | 10/1983 |
| DE | 1179174 B | 10/1964 |
| DE | 7116170 | 8/1971 |
| DE | 2035291 | 1/1972 |
| DE | 114938 | 9/1975 |
| DE | 4001787 C1 | 4/1991 |
| DE | 20 2015 105 036 U1 | 2/2017 |
| DE | 10 2017 120 012 A1 | 1/2019 |

* cited by examiner

*Primary Examiner* — Sang K Kim
(74) *Attorney, Agent, or Firm* — Maginot, Moore & Beck, LLP (57) ABSTRACT

The invention relates to a brake device (1) for braking an elongate medium (10) that is to be wound up, having an energy recovery device (16a; 16b; 16c; 16d) which is coupled to the at least one braking roller (14a) and which is designed to act on the at least one braking roller (14a) with a predefined braking moment in order to brake the elongate medium (10) that is to be wound up. The invention furthermore relates to a method for operating a brake device (1) for braking an elongate medium (10) that is to be wound up.

17 Claims, 8 Drawing Sheets

BRAKE DEVICE AND METHOD FOR OPERATING A BRAKE DEVICE

This application claims priority to German Application No. DE 102018214862.7 filed on Aug. 31, 2018. The entire contents of the above-mentioned German patent application is incorporated herein by reference as part of the disclosure of this U.S. application.

The invention relates to a brake device for braking an elongate medium that is to be wound up. The invention furthermore relates to a method for operating a brake device for braking an elongate medium that is to be wound up.

PRIOR ART

It is conventional for large rolls of sheet steel to be unrolled on a slit strip installation and to be cut lengthwise into narrower sheet strips. These are, after the cutting process, rolled up again on a winding reel. During the winding process, however, depending on the sheet thickness, an offset may occur in an axial direction of the roll of sheet steel.

This is disadvantageous with regard to further processing of the rolls of sheet steel in downstream working processes, because the further processing is made more difficult by this.

The problem of the occurrence of an offset or winding error arises because the slit strip installation has originally been designed for thinner material, but has over time been gradually upgraded in order to be able to process or cut relatively thick sheet thicknesses.

The strip brake which is required for the winding of the coils and which is arranged upstream of a winding-up reel has however hitherto conventionally not been adapted to the greater sheet thicknesses. Owing to the braking power being too low, winding errors therefore repeatedly occur in the case of greater sheet thicknesses.

DE 40 01 787 C1 discloses a method for simultaneously winding up multiple mutually separate steel strips, which are formed by longitudinal division of one wide metal strip, on one common winding-up mandrel which can be expanded in diameter, wherein, firstly, the strip starting ends of all slit strips that are to be wound up simultaneously are fixed with predetermined axial spacings to one another on the winding-up mandrel.

Then, by rotation of said winding-up mandrel, the slit strips are wound up under tension, in more than one starting winding, onto the expanded winding-up mandrel, and two starting windings, situated radially one on top of the other, of the respective slit strip are connected to one another fixedly in terms of tangential shear in order to thus form a closed sleeve from the starting windings of each slit strip.

DE 20 2015 105 036 U1 discloses a holding device for rolls, comprising an areal supporting belt for encompassing a circumference of at least one roll, and comprising two rotatable drums, wherein the ends of the supporting belt are fastened to the drums, such that, during a rotation of at least one of the drums, the supporting belt is at least partially rolled up on a drum.

In the case of above-stated conventional solutions, it is however disadvantageously possible for an offset to occur in an axial direction of the roll of sheet steel during the winding onto the winding-up reel.

Furthermore, generic strip brake devices are generally designed such that the braking of the material in strip form is effected by pressing a pad-type brake against the material in strip form by the strip brake device. This has the disadvantage inter alia that, in the event of an accumulation of dust or for example metal chips that may arise during the slitting of the roll, this or these can disadvantageously be pressed by the pad-type brake into the material in strip form and thus lead to scratching of and damage to the material in strip form. Secondly, the braking of the material by means of the conventional pad-type brake is energy-intensive.

It is therefore the object of the present invention to provide a brake device for braking an elongate medium that is to be wound up, which brake device permits error-free winding of the material in strip form in various material thicknesses and which brake device is operable in an energy-efficient manner.

The object is achieved by means of a brake device having the features of patent claim 1. The object is furthermore achieved by means of a method for operating a brake device having the features of patent claim 15. The object is moreover achieved by means of a slit strip installation for longitudinally dividing an elongate medium that is to be wound up, having the features of patent claim 16.

DISCLOSURE OF THE INVENTION

The present invention provides a brake device for braking an elongate medium that is to be wound up, having a holding device in which at least one braking roller and at least one counterpart arranged adjacent to the at least one braking roller are arranged, wherein the at least one braking roller is rotatably mounted at axial end portions in the holding device, wherein the elongate medium to be wound up can be led through between the at least one braking roller and the at least one counterpart and forms frictional contact with the at least one braking roller and the at least one counterpart, and having an energy recovery device which is coupled to the at least one braking roller and which is designed to act on the at least one braking roller with a predefined braking moment in order to brake the elongate medium that is to be wound up.

The present invention furthermore provides a method for operating a brake device for braking an elongate medium that is to be wound up. The method comprises providing a holding device in which a braking roller and at least one counterpart arranged adjacent to the at least one braking roller are arranged, wherein the at least one braking roller is rotatably mounted at axial end portions in the holding device.

The method furthermore comprises arranging the at least one braking roller and the at least one counterpart arranged adjacent to the at least one braking roller such that the elongate medium to be wound up can be led through between the at least one braking roller and the at least one counterpart and forms frictional contact with the at least one braking roller and the at least one counterpart.

The method furthermore comprises converting kinetic energy of the at least one braking roller by means of an energy recovery device which is coupled to the at least one braking roller and which acts on the at least one braking roller with a predefined braking moment in order to brake the elongate medium that is to be wound up.

The present invention moreover provides a slit strip installation for longitudinally dividing an elongate medium that is to be wound up, preferably a steel strip, having an unwinding reel, a winding-up reel and a brake device according to the invention arranged between the unwinding reel and the winding-up reel.

It is a concept of the present invention, through the provision of the energy recovery device, which is coupled to the at least one braking roller, to advantageously recuperate braking power of the at least one braking roller for braking the material in strip form, and thus make said braking power available to a further consumer. The energy that is normally wasted during the braking of the elongate medium that is to be wound up can thus be made reusable.

Furthermore, a surface of the elongate medium that is to be wound up can be preserved through the provision of the at least one braking roller, because, by contrast to the brake pads, only punctiform contact is provided in the case of the rolling of the brake roller on the elongate medium, by contrast to linear contact in the case of the pad-type brake of the prior art.

Advantageous embodiments and refinements will emerge from the subclaims and from the description with reference to the figures.

In a preferred refinement, provision is made whereby the at least one counterpart arranged in the holding device is formed by at least one further braking roller or a slide base, and wherein the at least one braking roller is coupled to the energy recovery device directly or via a transmission. Thus, the brake device can advantageously be adapted to respective system and structural requirements. In the case of the provision of only one braking roller, this may for example be coupled directly to the energy recovery device. In the case of the provision of a multiplicity of braking rollers, these may for example be coupled to a transmission, which in turn is connected to the energy recovery device.

In a further preferred refinement, provision is made whereby the at least one further braking roller is coupled to the energy recovery device, wherein the energy recovery device is designed to act on the further braking roller with a predefined braking moment in order to brake the elongate medium that is to be wound up.

As a result of the elongate medium that is to be wound up being acted on with the predefined braking moment, the energy recovery device can advantageously recuperate the braking power and make said braking power available to another suitable consumer.

In a further preferred refinement, provision is made whereby the energy recovery device is formed by an electrical generator, a hydraulic pump, a pneumatic pump or a mechanical device. Owing to the multiplicity of possible designs of the energy recovery device, flexibility exists with regard to the form of the recuperated energy, depending on the type of consumer that the recuperated energy is to be provided to.

In a further preferred refinement, provision is made whereby the at least one braking roller is, for the conversion of kinetic energy into electrical energy, coupled to the electrical generator, wherein the electrical energy generated by the electrical generator can be provided to a first consumer, in particular an electrical consumer, or can be fed into the grid.

The design of the energy recovery device in the form of an electrical machine, which is operated as a generator, advantageously offers the greatest possible flexibility, because a multiplicity of consumers can be driven with the generated electrical energy, or the energy can be fed into the grid.

In a further preferred refinement, provision is made whereby the at least one braking roller is, for the conversion of kinetic energy into a hydraulic pressure, coupled to the hydraulic pump, wherein the hydraulic pressure generated by the hydraulic pump can be provided to a second consumer, or whereby the at least one braking roller is, for the conversion of kinetic energy into a pneumatic pressure, coupled to the pneumatic pump, wherein the pneumatic pressure generated by the pneumatic pump can be provided to a third consumer, or whereby the at least one braking roller is coupled to a shaft for driving a fourth consumer. It is thus advantageously possible for the energy recovery device to be implemented in the form of a suitable solution in a manner dependent on the individual requirements.

In a further preferred refinement, provision is made whereby a braking moment generated by the energy recovery device can be controlled in a variable manner by means of a control device, wherein the control device is formed by a mechanical controller or an electrical controller. Braking power of the at least one braking roller coupled to the energy recovery device can thus be individually adapted to a thickness of the elongate medium that is to be wound up, such that the braking power can be optimally set for a thickness, which is to be processed, of the elongate medium. In this way, an offset during the winding in an axial direction of the elongate medium can be prevented, and kinetic energy of the at least one braking roller can additionally be recuperated.

In a further preferred refinement, provision is made whereby, in the holding device, a first braking roller pair, a second braking roller pair and a third braking roller pair are arranged so as to be offset with respect to one another in a longitudinal direction of the holding device and adjustable in height, wherein the first braking roller pair, the second braking roller pair and the third braking roller pair are adjustable in height from an operational position into a non-operational position.

The provision of multiple braking roller pairs has the advantage that, by contrast to the provision of only one braking roller pair, less torque is transmitted by each of the braking roller pairs onto shafts that connect the braking roller pair to a transmission. Furthermore, through the provision of a multiplicity of braking roller pairs, redundancy is provided in the strip brake device, by means of which redundancy a failure of one of the braking roller pairs can be compensated by means of one of the further braking roller pairs.

The height adjustability of the respective braking roller pairs furthermore makes it possible for a number of braking roller pairs that is used to be controllable in a manner dependent on individual requirements on the braking power, such that, in the present strip brake device, it is for example possible for one braking roller pair, two braking roller pairs or three braking roller pairs to be used.

In a further preferred refinement, provision is made whereby a height position of the braking roller and/or of the further braking roller is adjustable by means of hydraulic cylinders which are connected to the braking roller and to the further braking roller at respective axial end portions of said braking roller and further braking roller and which are fastened to the holding device.

It is thus possible for the braking roller and/or the further braking roller of the respective braking roller pair to be adjusted from the operational position into the non-operational position and vice versa by means of the hydraulic cylinders as required.

In a further preferred refinement, provision is made whereby the braking roller and the further braking roller have, at the axial end portions, a spline shaft, wherein the spline shaft of the braking roller is connected in positively locking fashion to a spline hub of a first articulated shaft flange, and the spline shaft of the further braking roller is connected in positively locking fashion to a spline hub of a second articulated shaft flange.

The design of the axial end portions of the braking roller and of the further braking roller in the form of a spline hub permits an efficient transmission of torque to downstream shafts, without slippage occurring. By means of the positively locking connection of the spline shaft of the braking roller to the spline hub of a first articulated shaft flange and of the spline shaft of the further braking roller to a spline hub of a second articulated shaft flange, an effective transmission of force from the spline shaft to the spline hub of the respective articulated shaft flange can be made possible.

In a further preferred refinement, provision is made whereby the first articulated shaft flange is connected to a first articulated shaft and the second articulated shaft flange is connected to a second articulated shaft, wherein the first articulated shaft is connected to a first input shaft of the transmission and the second articulated shaft is connected to a second input shaft of the transmission.

Kinetic energy of each individual one of the braking rollers can thus be transmitted directly by means of an articulated shaft to the transmission.

In a further preferred refinement, provision is made whereby the transmission is designed to synchronize a rotational speed of the first braking roller and of the second braking roller of the at least one braking roller pair and to merge the torque thereof onto a common output shaft of the transmission.

The provision of the transmission thus has the advantage that a rotational speed of the braking roller and of the further braking roller of a respective braking roller pair can always be kept synchronized, which contributes to uniform braking of the elongate medium by means of the respective braking roller pair.

In a further preferred refinement, provision is made whereby the first articulated shaft is designed to compensate a height offset of the braking roller with respect to the first input shaft of the transmission, and wherein the second articulated shaft is designed to compensate a height offset of the further braking roller with respect the second input shaft of the transmission. The provision of the articulated shafts thus has the advantage that the respective braking rollers are always connected to the associated input shaft of the transmission, regardless of whether the respective braking rollers are arranged in an operational position or in a non-operational position.

In a further preferred refinement, provision is made whereby the transmission is formed by a straightening machine transmission, wherein the transmission is coupled by means of a chain drive to the electrical generator. The provision of a straightening machine transmission permits an effective transmission of torque from the multiplicity of input shafts to a common output shaft of the transmission, wherein the chain drive permits a structurally simple and reliable transmission of force from the transmission to the electrical generator.

The described embodiments and refinements may be combined with one another in any desired manner.

Further possible embodiments, refinements and implementations of the invention also encompass combinations, which have not explicitly been mentioned, of features of the invention that are described above or below with regard to the exemplary embodiments.

BRIEF DESCRIPTION OF THE DRAWINGS

The appended drawings are intended to impart further understanding of the embodiments of the invention. They illustrate embodiments and serve, in conjunction with the description, for explaining principles and concepts of the invention.

Other embodiments, and many of the stated advantages, will emerge with regard to the drawings. The illustrated elements of the drawings are not necessarily shown true to scale with respect to one another.

In the drawings.

In the figures of the drawings, identical reference designations denote identical or functionally identical elements, parts or components, unless stated otherwise.

DETAILED DESCRIPTION

Figure 1:
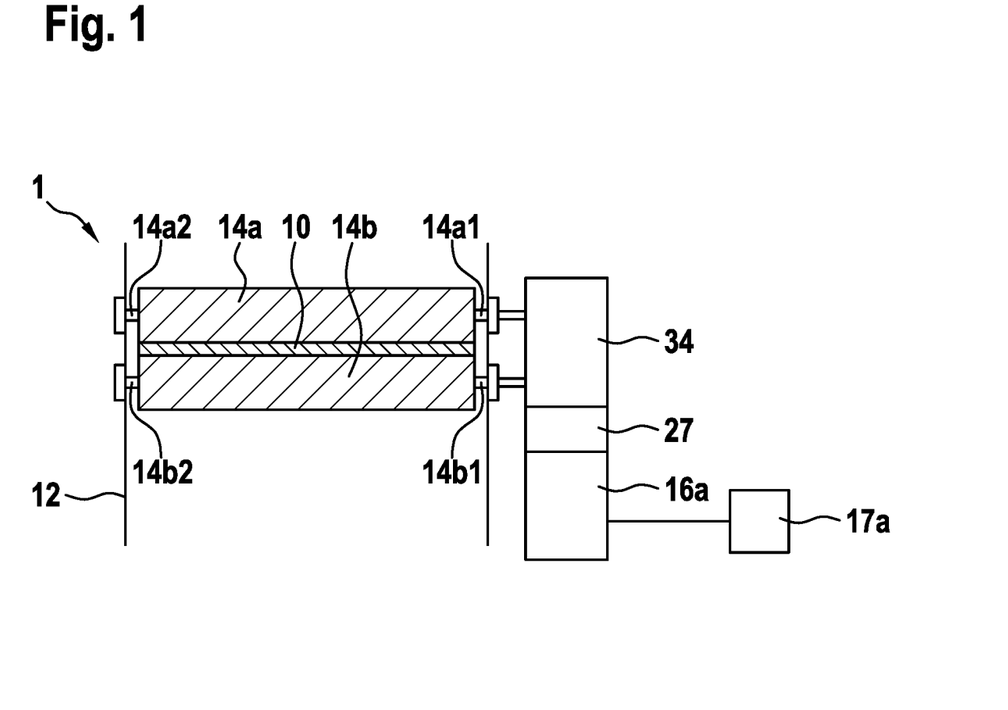
FIG. 1 is a schematic illustration of a brake device for braking an elongate medium to be wound up, as per a preferred embodiment of the invention.

FIG. 1 is a schematic illustration of a brake device for braking an elongate medium to be wound up, as per a preferred embodiment of the invention.

The brake device 1 for braking the elongate medium 10 to be wound up has a holding device 12.

A braking roller 14a and a further braking roller 14b are arranged in the holding device 12. The braking roller 14a is rotatably mounted at axial end portions 14a1, 14a2 in the holding device 12. Furthermore, the further braking roller 14b is likewise rotatably mounted at axial end portions 14b1, 14b2 in the holding device 12.

The elongate medium 10 to be wound up can be led through between the braking roller 14a and the further braking roller 14b, and forms frictional contact with the braking roller 14a and the further braking roller 14b.

The brake device 1 furthermore has an energy recovery device 16a which is coupled to the braking roller 14a and to the further braking roller 14b by means of a transmission 34 and which is designed to act on the braking roller 14a and the further braking roller 14b with a predefined braking torque in order to brake the elongate medium 10 that is to be wound up.

The elongate medium 10 that is to be wound up is formed preferably by a roll of sheet metal, for example a roll of sheet steel, particularly preferably a roll of high-grade sheet steel. Alternatively, the elongate medium to be wound up may be formed for example by a wire, a paper web or some other material in web form.

In the present embodiment, the energy recovery device 16a is formed by an electrical generator 16a. The braking roller 14a and the further braking roller 14b are, for the conversion of kinetic energy into electrical energy, coupled to the electrical generator 16a.

The energy generated by means of the electrical generator can be made available to a first consumer 17a, in particular an electrical consumer, or can be fed into the grid. Furthermore, a control device 27 is provided which permits variable control of the braking moment generated by the electrical generator 16a.

The control device 27 is formed preferably by a mechanical controller. Alternatively, the control device 27 may be formed for example by an electrical controller.

Figure 2:
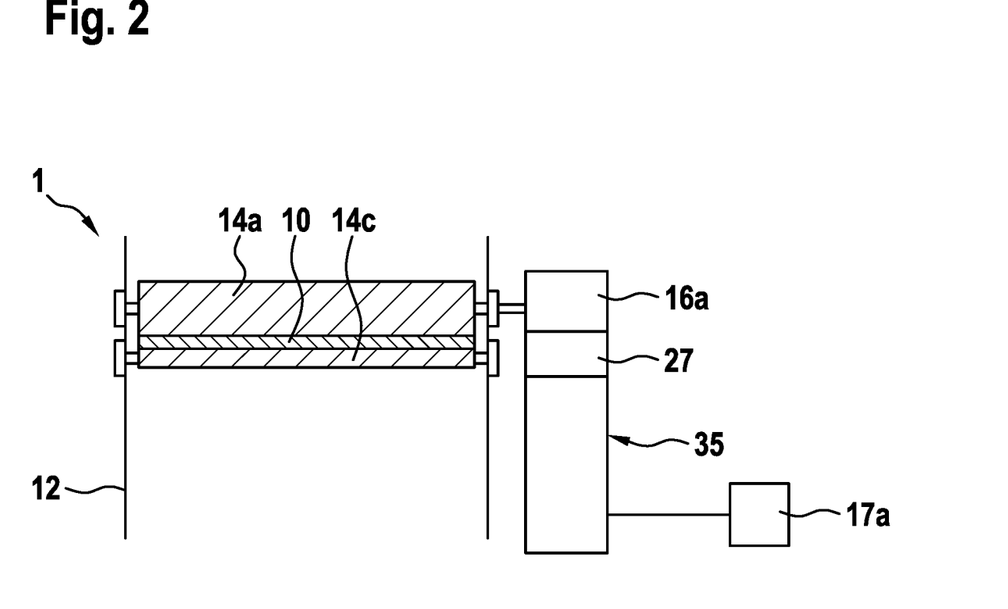
FIG. 2 is a schematic illustration of the brake device for braking an elongate medium to be wound up, as per a further preferred refinement of the invention.

FIG. 2 is a schematic illustration of the brake device for braking the elongate medium to be wound up, as per a further preferred refinement of the invention.

In the present embodiment, the counterpart 14c arranged in the holding device 12 is formed by a slide base 14c. Thus, only the braking roller 14a is coupled to the energy recovery device 16a formed as an electrical generator. Since, in the present embodiment, only one braking roller 14a is provided, the electrical generator 16a can be coupled directly to the braking roller 14a without the provision of a transmission. The electrical generator 16a and the controllers 27 are, in the present embodiment, arranged in a common housing 35.

Figure 3:
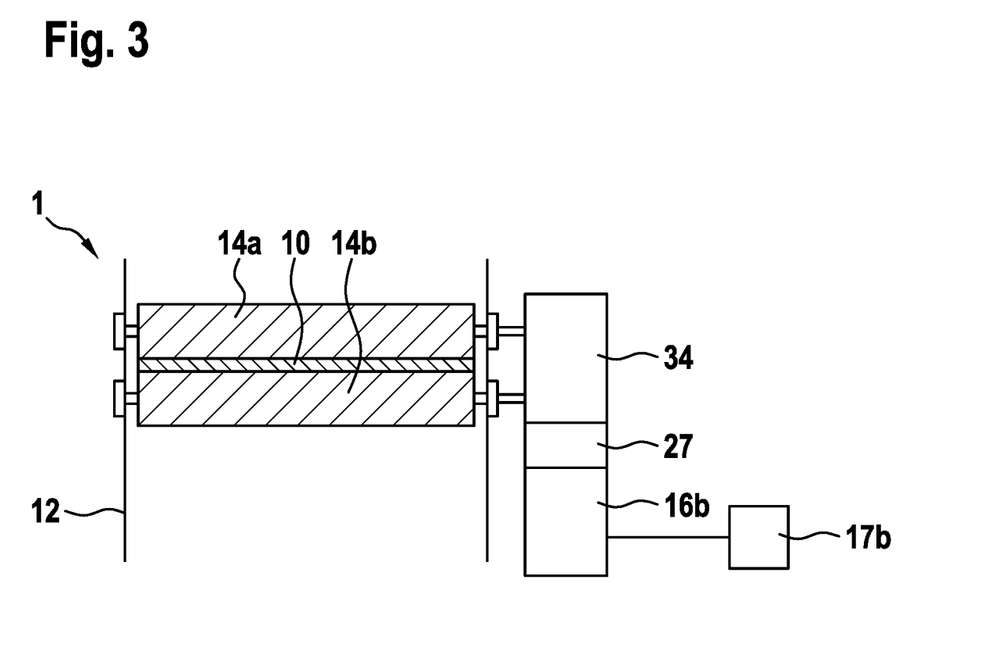
FIG. 3 is a schematic illustration of the brake device for braking an elongate medium to be wound up, as per a further preferred refinement of the invention.

FIG. 3 is a schematic illustration of the brake device for braking the elongate medium to be wound up, as per a further preferred refinement of the invention.

In the present embodiment, the braking roller 14a and the further braking roller 14b are arranged in the holding device 12, between which rollers the elongate medium 10 to be wound up can be led through. The energy recovery device 16b is formed by a hydraulic pump 16b.

A hydraulic pressure generated by means of the hydraulic pump 16b can be made available to a second consumer 17b. Kinetic energy of the braking roller 14a and of the further braking roller 14b can thus be converted by the hydraulic pump 16b into a hydraulic pressure of a fluid.

Figure 4:
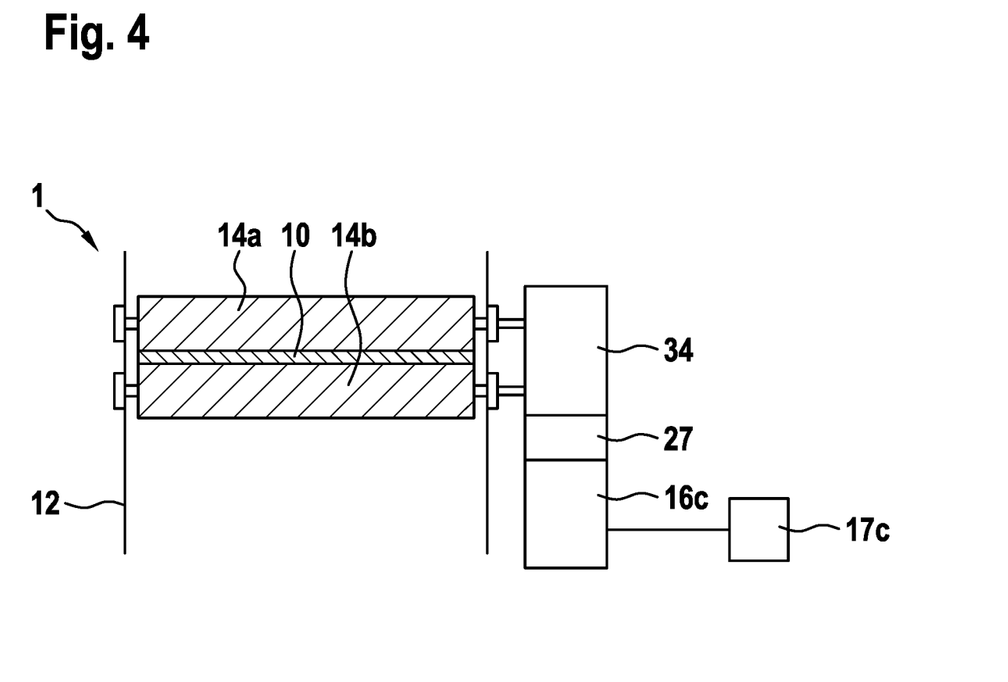
FIG. 4 is a schematic illustration of the brake device for braking an elongate medium to be wound up, as per a further preferred refinement of the invention.

FIG. 4 is a schematic illustration of the brake device for braking the elongate medium to be wound up, as per a further preferred refinement of the invention.

In the present embodiment, the braking roller 14a and the further braking roller 14b are arranged in the holding device 12, between which rollers the elongate medium 10 to be wound up can be led through. The energy recovery device 16b is formed by a pneumatic pump 16c.

A pneumatic pressure generated by means of the pneumatic pump 16c can be made available to a second consumer 17c. Kinetic energy of the braking roller 14a and of the further braking roller 14b can thus be converted by the pneumatic pump 16c into a pneumatic pressure of a fluid.

Figure 5:
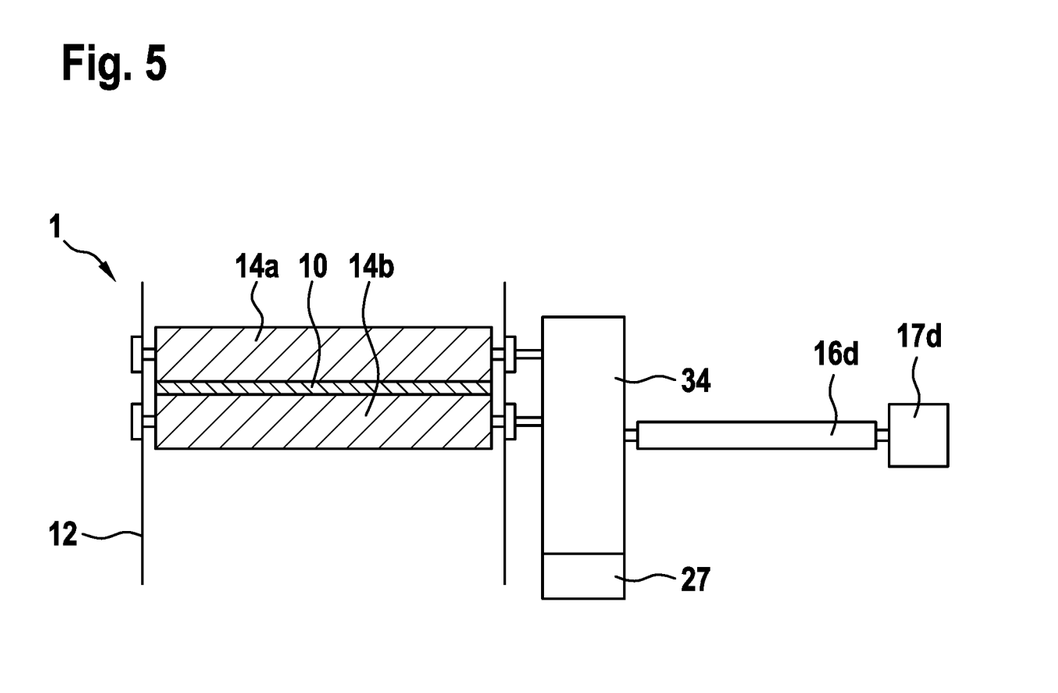
FIG. 5 is a schematic illustration of the brake device for braking an elongate medium to be wound up, as per a further preferred refinement of the invention.

FIG. 5 is a schematic illustration of the brake device for braking the elongate medium to be wound up, as per a further preferred refinement of the invention.

In the present embodiment, the braking roller 14a and the further braking roller 14b are arranged in the holding device 12, between which rollers the elongate medium 10 to be wound up can be led through, wherein the braking roller 14a and the further braking roller 14b are coupled by means of a transmission 34 to a shaft 16d for driving a fourth consumer 17d.

The energy recovery device 16d is thus formed by the shaft 16d for driving the fourth consumer 17d.

Figure 6:
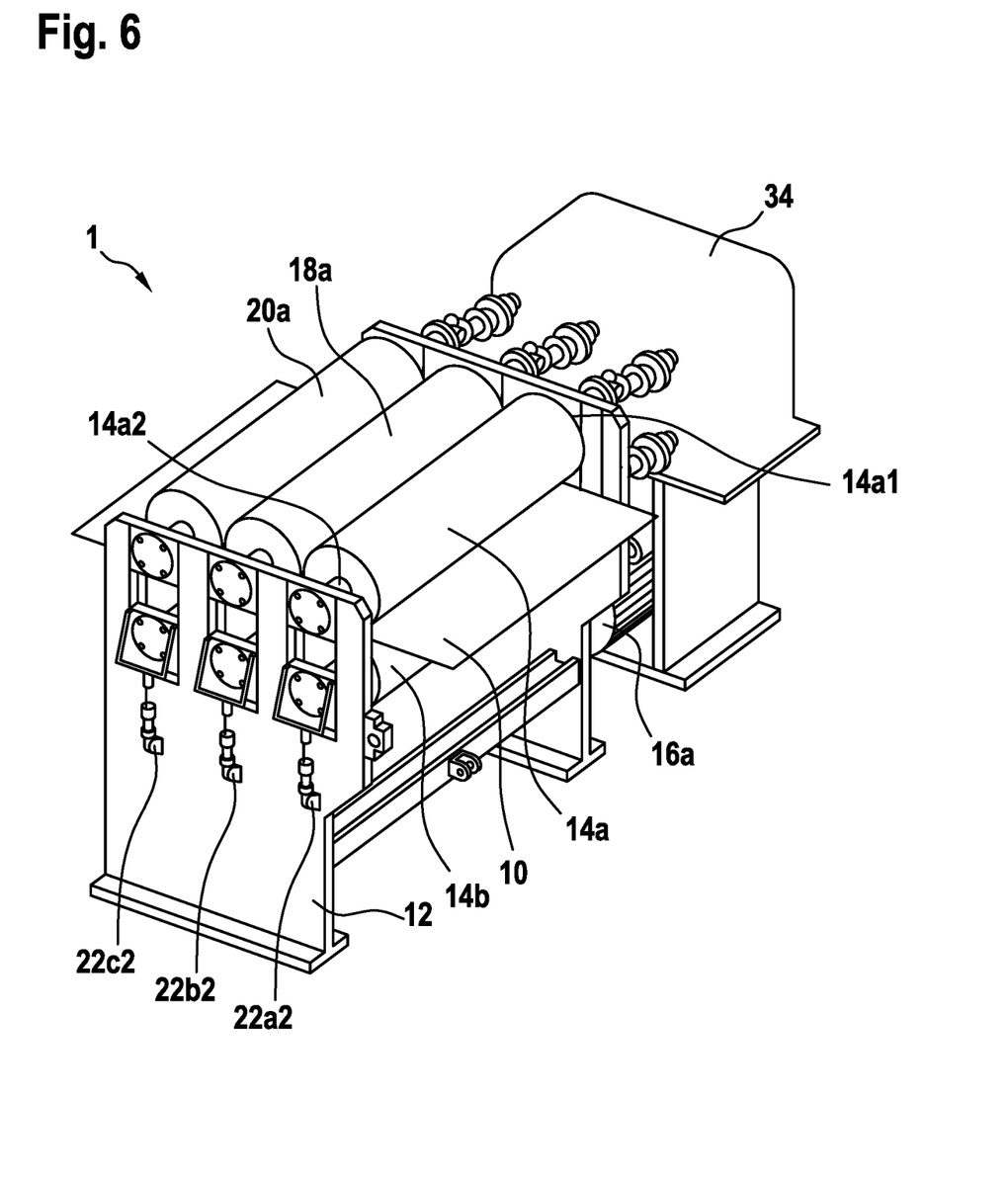
FIG. 6 is a schematic illustration of the brake device for braking an elongate medium to be wound up, as per a further preferred refinement of the invention.

FIG. 6 is a schematic illustration of the brake device for braking the elongate medium to be wound up, as per a further preferred refinement of the invention.

The elongate medium 10 is formed preferably by a roll of sheet steel. Alternatively, the elongate medium 10 may be formed for example by a roll of paper or plastic or a roll of wire. The brake device 1 for braking the elongate medium 10 to be wound up furthermore has the holding device 12.

In the present embodiment, three braking roller pairs are arranged in the holding device 12, wherein, in the present view, it is possible to see a first braking roller pair 14a, 14b and in each case one upper braking roller 18a, 20a of a second braking roller pair and of a third braking roller pair.

The respective braking roller pairs, discussed by way of example on the basis of the first braking roller pair 14a, 14b, are rotatably mounted at respective axial end portions in the holding device 12.

Thus, the first braking roller pair 14a, 14b is rotatably mounted at corresponding axial portions 14a1, 14b1 in the holding device 12. The first braking roller pair has the braking roller 14a and the further braking roller 14b, which are arranged relative to one another in the holding device 12 such that the elongate medium 10 can be led through between the braking roller 14a and the further braking roller 14b.

The brake device 1 is coupled by the connecting means described in the following figures to the transmission 34, which in turn is connected to an electrical generator 16a. Kinetic energy of the respective braking roller pair that is used is thus transmitted to the electrical generator 16a for conversion of the kinetic energy into electrical energy.

The transmission 34 is furthermore designed to synchronize a rotational speed of the braking roller 14a and of the further braking roller 14b of the first braking roller pair 14a, 14b and to merge the torque thereof onto a common output shaft (not shown in FIG. 1) of the transmission 34. The same applies to the respective braking rollers of the second braking roller pair and of the third braking roller pair.

The transmission is shown in FIGS. 6-9 and the connecting means for connecting the respective braking rollers to the transmission are likewise applicable to the embodiments shown in FIGS. 1, 3, 4 and 5.

Figure 7:
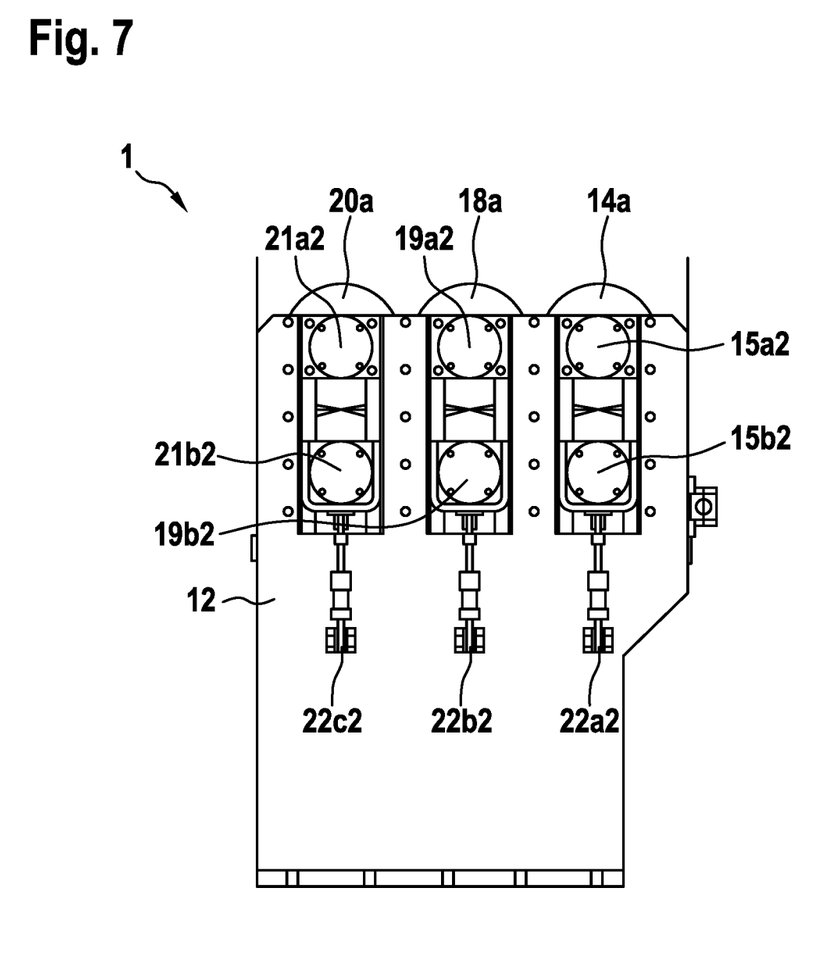
FIG. 7 shows a side view of the brake device for braking the elongate medium to be wound up, as per the further preferred embodiment of the invention shown in FIG. 6.

FIG. 7 shows a side view of the brake device for braking the elongate medium to be wound up, as per the further preferred embodiment of the invention shown in FIG. 6.

A height position of the braking roller 14a and of the further braking roller 14b of the first braking roller pair, of the second braking roller pair and of the third braking roller pair is adjustable by means of hydraulic cylinders 22a1, 22b2, 22c2 which are connected to the braking roller and to the further braking roller of the respective braking roller pair at respective axial end portions of said braking roller and further braking roller and which are fastened to the holding device 12.

In the present side view, one of the two sides of the holding device is illustrated. The braking roller and the further braking roller of the respective braking roller pair are in this case arranged movably in a substantially vertically arranged slot.

The connection of the respective hydraulic cylinder to the respective upper braking roller is not shown in the present illustration, wherein it is clear to a person skilled in the art that the upper braking roller and the lower braking roller can be connected, by means of a respective mechanism suitable for this purpose, such that said upper braking roller and lower braking roller can be moved synchronously toward one another and away from one another in the event of actuation of the hydraulic cylinder.

Alternatively, the respective hydraulic cylinder may for example be connected only to one of the lower braking rollers of the respective braking roller pair, and the respective upper braking roller of the corresponding braking roller pair may be fixed in the holding device, such that, in the event of a movement of a respective braking roller pair into a disengaged position or non-operational position, only one of the two braking rollers of the respective braking roller pair is moved.

The braking roller 14a of the first braking roller pair is rotatably mounted at one of its axial end portions by means of a bearing 15a2 in the holding device 12. The further braking roller 14b is rotatably mounted by means of a bearing 15b2 in the holding device 12.

Equally, one braking roller 18a of the second braking roller pair is rotatably mounted by means of a bearing 19a2, and the further braking roller (not shown in FIG. 7) of the second braking roller pair is rotatably mounted by means of a bearing 19b2, in the holding device 12.

Furthermore, the braking roller 20a1 of the third braking roller pair is rotatably mounted by means of a bearing 21a2, and the further braking roller (not shown in FIG. 7) of the third braking roller pair is rotatably mounted by means of a bearing 21b2, in the holding device 12.

Figure 8:
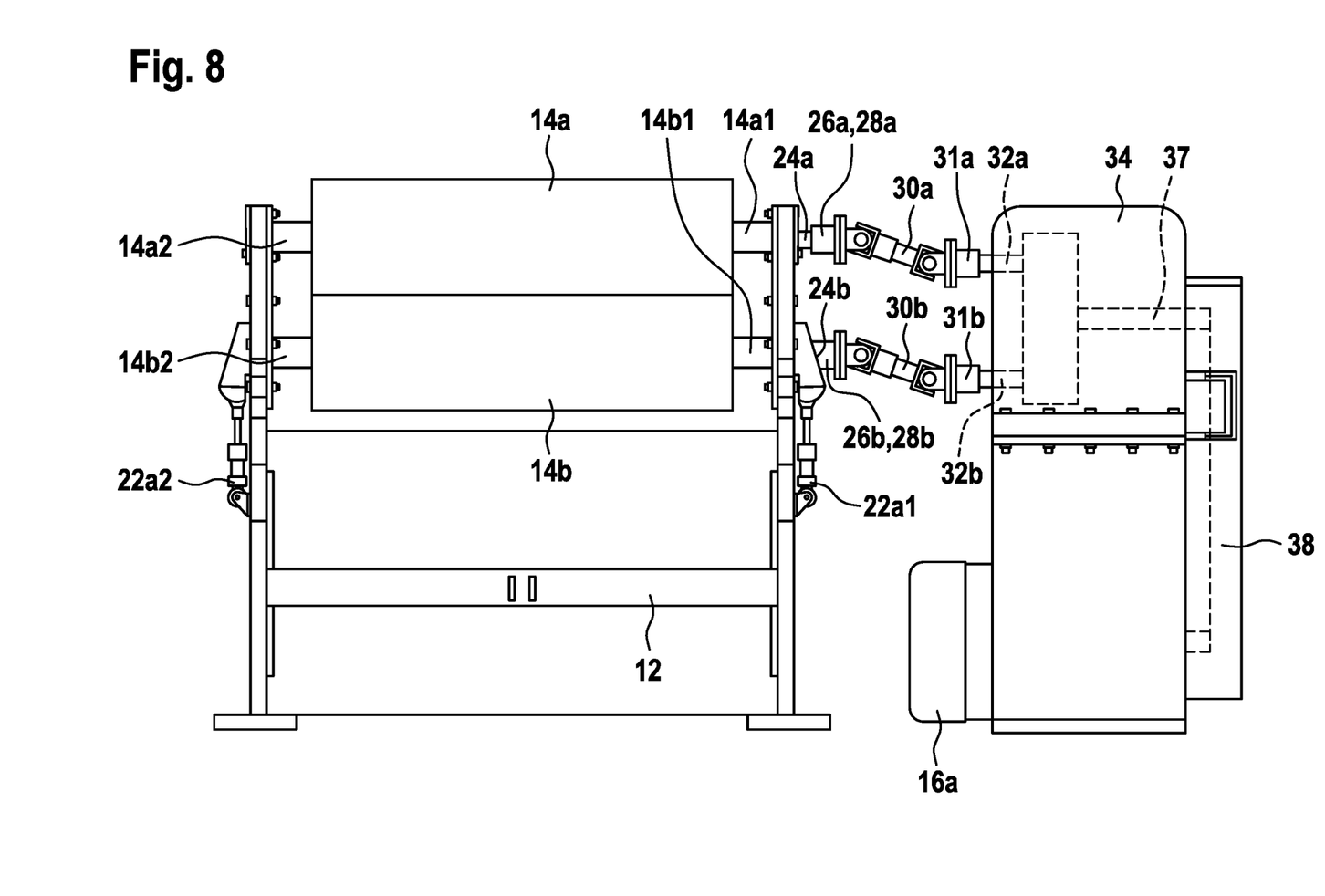
FIG. 8 shows a further side view of the brake device for braking the elongate medium to be wound up, as per the further preferred embodiment of the invention shown in FIG. 6.

FIG. 8 shows a further side view of the brake device for braking the elongate medium to be wound up, as per the further preferred embodiment of the invention shown in FIG. 6.

The braking roller 14a and the further braking roller 14b of the first braking roller pair have, at axial end portions 14a1, 14b2, a spline shaft 24a, 24b. The axial end portions 14a1, 14b2 are in this case arranged on a side of the holding device 12 which is situated opposite the transmission 34.

The spline shaft 24a of the braking roller 14a is connected in positively locking fashion to a spline hub 26a of a first spline shaft flange 28a. Furthermore, the spline shaft 24b of the further braking roller 14b is connected in positively locking fashion to a spline hub 26b of a second articulated shaft flange 28b.

The first articulated shaft flange 28a is connected to a first articulated shaft 30a. Furthermore, the second articulated shaft flange 28b is connected to a second articulated shaft 30b.

The first articulated shaft 30a is connected to a first input shaft 32a of the transmission 34. Furthermore, the second articulated shaft 30b is connected to a second input shaft 32b of the transmission 34. The first input shaft 32a and the second input shaft 32b of the transmission 34 are, in the transmission 34, merged onto the common output shaft 37, which is coupled by means of a chain drive 38 to the electrical generator 16a arranged therebelow. The transmission 34 is preferably formed by a straightening machine transmission.

Furthermore, the first articulated shaft 30a is designed to compensate a height offset of the braking roller 14a with respect to the first input shaft 32a of the transmission 34. Furthermore, the second articulated shaft 30b is designed to compensate a height offset of the further braking roller 14b with respect to the second input shaft 32b of the transmission 34.

The first input shaft 30a and the second input shaft 30b are each designed to transmit a torque of up to 3000 Nm to the transmission.

The braking roller 14a and the further braking roller 14b of the first braking roller pair 14a, 14b and of the second and third braking roller pairs (not illustrated in FIG. 8) each have a diameter/length ratio of 0.1 to 0.5, preferably of 0.2 to 0.4, particularly preferably of 0.2 to 0.3.

Figure 9:
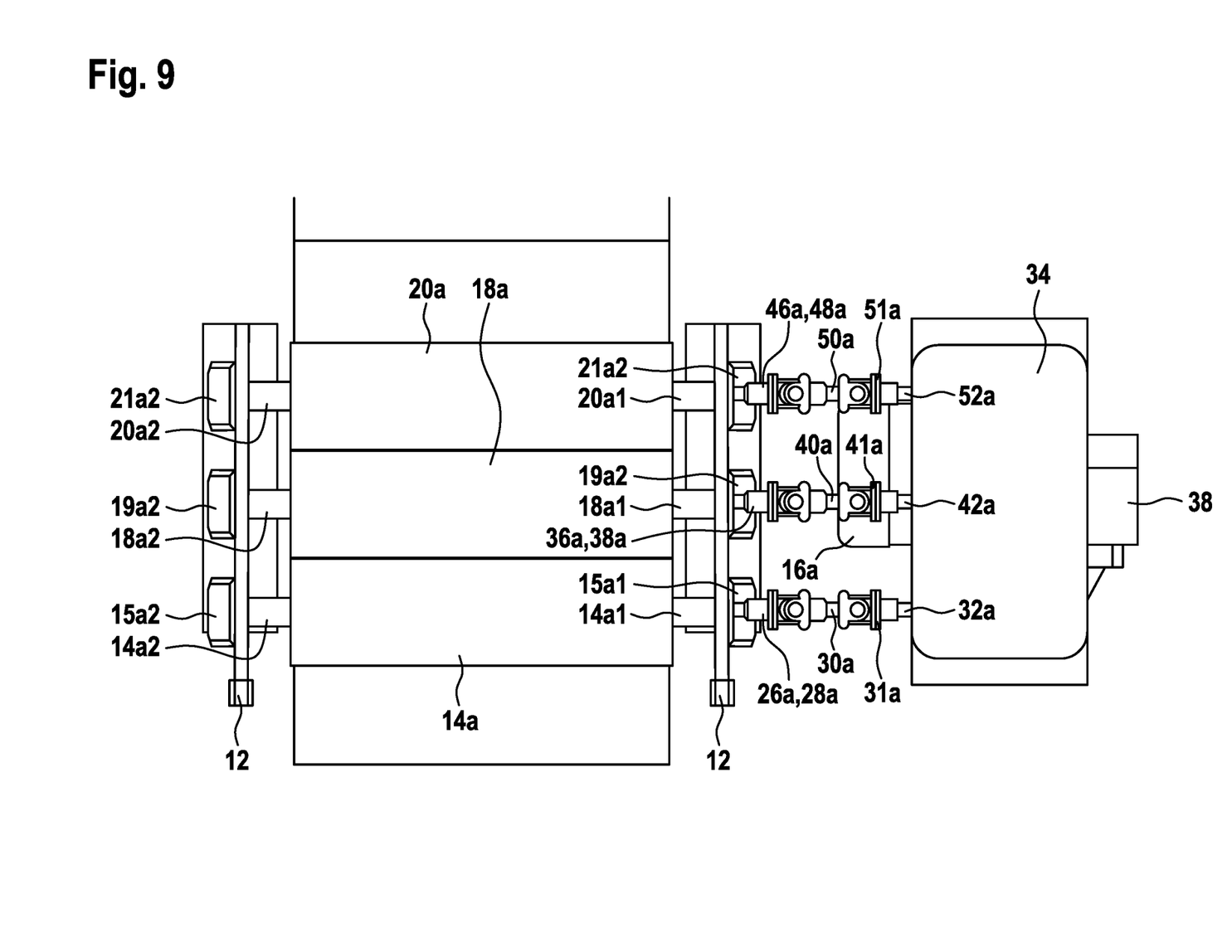
FIG. 9 shows a plan view of the brake device for braking the elongate medium to be wound up, as per the further preferred embodiment of the invention shown in FIG. 6.

FIG. 9 shows a plan view of the brake device for braking the elongate medium to be wound up as per the further preferred embodiment of the invention shown in FIG. 6.

In the holding device 12, the first braking roller pair 14a, 14b, the second braking roller pair 18a, 18b and the third braking roller pair 20a, 20b are arranged sequentially in a conveying direction of the elongate medium 10 to be wound up, wherein, in the present illustration, in each case only the respective upper braking roller of the respective braking roller pair is shown.

The transmission 34 converts the rotational speed of the braking roller 14a, 18a, 20a and of the further braking roller 14b, 18b, 20b of the respective braking roller pairs into a higher rotational speed with a ratio of 1:15 to 1:25, preferably of 1:19.

As already described in FIG. 8 with regard to the braking roller 14a and the further braking roller 14b of the first braking roller pair, the braking roller and the further braking roller of the second braking roller pair and third braking roller pair are likewise connected by corresponding connecting means to the transmission 34.

Thus, as illustrated in FIG. 9, the braking roller 18a of the second braking roller pair is rotatably mounted in the holding device 12 at an axial end portion and has, at the respective axial end portion, a spline shaft which is connected in positively locking fashion to a spline hub 36a of a first articulated shaft flange 38a.

The first articulated shaft flange 38a is connected to a first articulated shaft 40a, wherein the first articulated shaft 40a is connected at its opposite axial end portion to a further articulated shaft flange 41a, which in turn is coupled to a first input shaft 42a of the transmission 34.

Furthermore, as illustrated in FIG. 9, the braking roller 18a of the third braking roller pair is rotatably mounted at an axial end portion in the holding device 12 and has, at the respective axial end portion, a spline shaft which is connected in positively locking fashion to a spline hub 46a of a first articulated shaft flange 48a.

The first articulated shaft flange 48a is connected to a first articulated shaft 50a, wherein the first articulated shaft 50a is connected, at its opposite axial end portion, to a further articulated shaft flange 51a, which in turn is coupled to a first input shaft 52a of the transmission 34.

Figure 10:
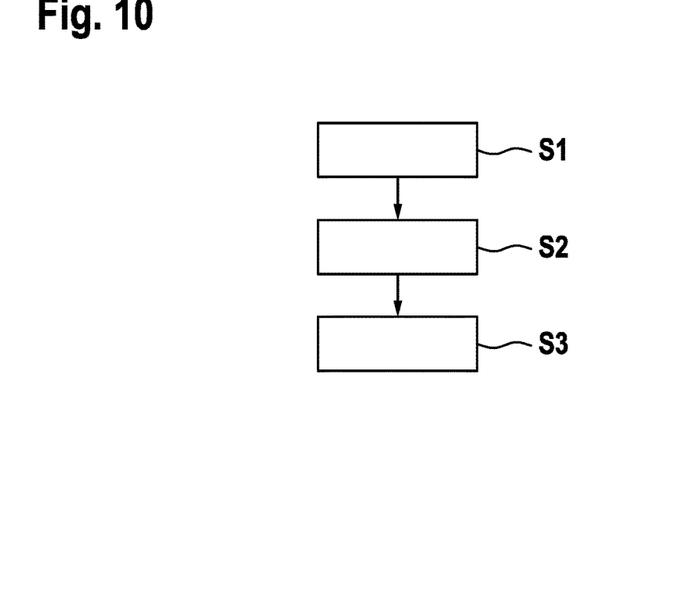
FIG. 10 shows a flow diagram of a method for operating a brake device for braking the elongate medium to be wound up, as per the preferred embodiment of the invention.

FIG. 10 shows a flow diagram of a method for operating a brake device for braking the elongate medium to be wound up, as per the preferred embodiment of the invention.

The method comprises providing S1 a holding device 12 in which at least one braking roller 14a and at least one counterpart 14b; 14c arranged adjacent to the at least one braking roller 14a are arranged, wherein the at least one braking roller 14a is rotatably mounted at axial end portions 14a1, 14a2 in the holding device 12.

The method furthermore comprises arranging S2 the at least one braking roller 14a and the at least one counterpart 14b; 14c arranged adjacent to the at least one braking roller 14a such that the elongate medium 10 to be wound up can be led through between the at least one braking roller 14*a* and the at least one counterpart 14*b*; 14*c* and forms frictional contact with the at least one braking roller 14*a* and the at least one counterpart 14*b*; 14*c*.

The method furthermore comprises converting S3 kinetic energy of the at least one braking roller 14*a* by means of an energy recovery device 16*a*; 16*b*; 16*c*; 16*d* which is coupled to the at least one braking roller 14*a* and which acts on the at least one braking roller 14*a* with a predefined braking moment in order to brake the elongate medium 10 that is to be wound up.

Figure 11:
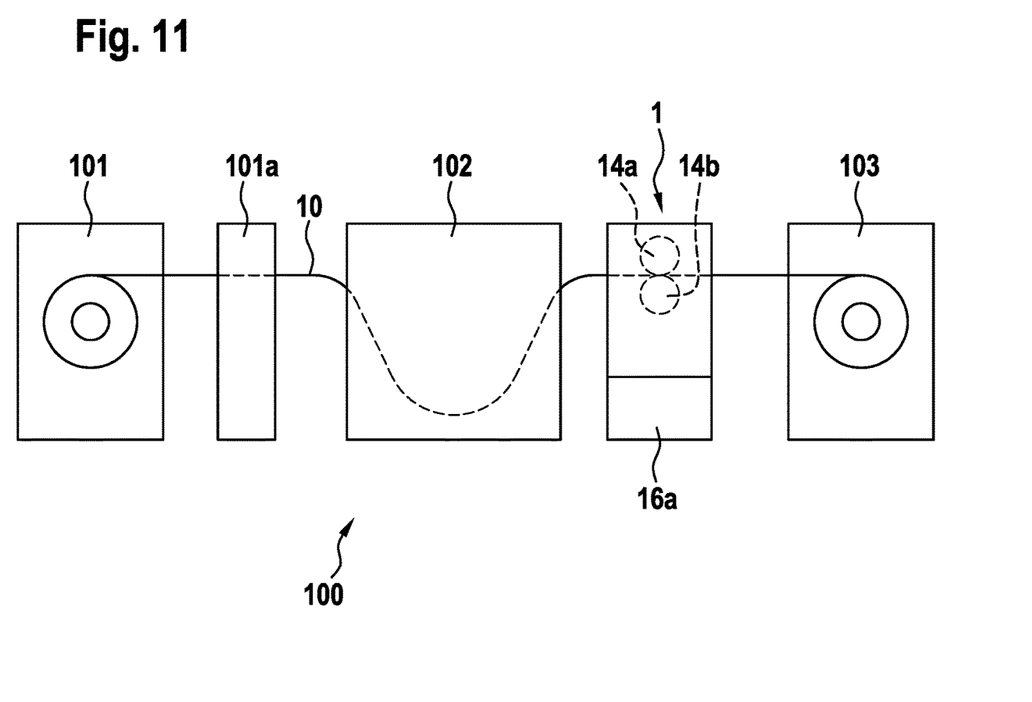
FIG. 11 is a schematic illustration of a slit strip installation for longitudinally dividing the elongate medium to be wound up, as per the preferred embodiment of the invention.

FIG. 11 is a schematic illustration of a slit strip installation for longitudinally dividing the elongate medium to be wound up, as per the preferred embodiment of the invention.

The slit strip installation 100 has an unwinding reel 101 in which a roll of the elongate medium is inserted or installed. Furthermore, the slit strip installation 100 has a slitting device 101*a* for slitting the elongate medium 10.

Downstream of this, the slit strip installation 100 has a pit 102, which is followed by the brake device 1 according to the present invention. Arranged so as to follow the brake device 1 is a winding-up reel 103, in which the slit, elongate medium 10 is rolled up again.

Although the present invention has been described above on the basis of preferred exemplary embodiments, it is not restricted to these, but rather may be modified in a many ways. In particular, the invention may be varied or modified in a wide variety of ways without departing from the core of the invention.

For example, a shape, dimension and/or condition of the components of the brake device may be modified.

The invention claimed is:

1. A brake device for braking an elongate medium that is to be wound up, comprising:
   a holding device in which at least one braking roller and at least one counterpart arranged adjacent to the at least one braking roller are arranged, wherein the at least one braking roller is rotatably mounted at axial end portions in the holding device, wherein the elongate medium to be wound up can be led through between the at least one braking roller and the at least one counterpart and forms frictional contact with the at least one braking roller and the at least one counterpart; and
   an energy recovery device which is coupled to the at least one braking roller and which is configured to act on the at least one braking roller with a predefined braking moment in order to brake the elongate medium that is to be wound up, said energy recovery device configured to convert kinetic energy of the at least one braking roller to electrical, hydraulic or pneumatic energy.

2. The brake device according to claim 1, wherein the at least one counterpart arranged in the holding device is formed by at least one further braking roller or a slide base, wherein the at least one braking roller is coupled to the energy recovery device directly or via a transmission.

3. The brake device according to claim 2, wherein the at least one further braking roller is coupled to the energy recovery device, wherein the energy recovery device is configured to act on the further braking roller with a predefined braking moment in order to brake the elongate medium that is to be wound up.

4. The brake device according to claim 1, wherein the energy recovery device is formed by one of an electrical generator, a hydraulic pump, a pneumatic pump or a mechanical device.

5. The brake device according to claim 4, wherein the at least one braking roller is coupled to the electrical generator for the conversion of kinetic energy into electrical energy.

6. The brake device according to claim 4, wherein the at least one braking roller is one of:
   coupled to the hydraulic pump for the conversion of kinetic energy into a hydraulic pressure;
   coupled to a pneumatic pump for the conversion of kinetic energy into a pneumatic pressure; and
   coupled to a shaft separate from the brake device for driving the shaft.

7. The brake device according to claim 4, wherein the at least one braking roller is coupled to the energy recovery device via a transmission, wherein the transmission is coupled by means of a chain drive to the electrical generator.

8. The brake device according to claim 1, wherein a braking moment generated by the energy recovery device can be controlled in a variable manner by means of a control device, wherein the control device is formed by a mechanical controller or an electrical controller.

9. The brake device according to claim 1, wherein, in the holding device, a first braking roller pair, a second braking roller pair and a third braking roller pair are arranged so as to be offset with respect to one another in a longitudinal direction of the holding device and adjustable in height, wherein the first braking roller pair, the second braking roller pair and the third braking roller pair are adjustable in height from an operational position into a non-operational position.

10. The brake device according to claim 1, wherein a height position of one or both of the braking roller and the further braking roller is adjustable by means of hydraulic cylinders which are connected to the braking roller and to the further braking roller at respective axial end portions of said braking roller and further braking roller and which are fastened to the holding device.

11. The brake device according to claim 1, wherein the braking roller and the further braking roller have, at the axial end portions, a spline shaft, wherein the spline shaft of the braking roller is connected in positively locking fashion to a spline hub of a first articulated shaft flange, and the spline shaft of the further braking roller is connected in positively locking fashion to a spline hub of a second articulated shaft flange.

12. The brake device according to claim 11, wherein the first articulated shaft flange is connected to a first articulated shaft and the second articulated shaft flange is connected to a second articulated shaft, wherein the first articulated shaft is connected to a first input shaft of a transmission and the second articulated shaft is connected to a second input shaft of the transmission.

13. The brake device according to claim 12, wherein the transmission is configured to synchronize a rotational speed of the first braking roller and of the second braking roller of the at least one braking roller pair and to merge the torque thereof onto a common output shaft of the transmission.

14. The brake device according to claim 1, wherein the first articulated shaft is configured to compensate a height offset of the braking roller with respect to the first input shaft of the transmission, and wherein the second articulated shaft is configured to compensate a height offset of the further braking roller with respect the second input shaft of the transmission.

15. A slit strip installation for longitudinally dividing an elongate medium that is to be wound up having an unwinding reel, a winding-up reel and a brake device according to claim 1 arranged between the unwinding reel and the winding-up reel.

16. The slit strip installation of claim 15, wherein said elongate medium is a steel strip.

17. A method for operating a brake device for braking an elongate medium that is to be wound up, having the steps:
- providing a holding device in which at least one braking roller and at least one counterpart arranged adjacent to the at least one braking roller are arranged, wherein the at least one braking roller is rotatably mounted at axial end portions in the holding device,
- arranging the at least one braking roller and the at least one counterpart arranged adjacent to the at least one braking roller such that the elongate medium to be wound up can be led through between the at least one braking roller and the at least one counterpart and forms frictional contact with the at least one braking roller and the at least one counterpart; and
- converting kinetic energy of the at least one braking roller to electrical, hydraulic or pneumatic energy by means of an energy recovery device which is coupled to the at least one braking roller and which acts on the at least one braking roller with a predefined braking moment in order to brake the elongate medium that is to be wound up.

\* \* \* \* \*